(12) United States Patent
Yang et al.

(10) Patent No.: US 9,032,399 B1
(45) Date of Patent: May 12, 2015

(54) MEASUREMENT OF INPUT/OUTPUT SCHEDULING CHARACTERISTICS IN DISTRIBUTED VIRTUAL INFRASTRUCTURE

(75) Inventors: Ziye Yang, Shanghai (CN); Haifeng Fang, Beijing (CN); David Black, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 349 days.

(21) Appl. No.: 13/536,099

(22) Filed: Jun. 28, 2012

(51) Int. Cl.
*G06F 9/455* (2006.01)
(52) U.S. Cl.
CPC .. *G06F 9/45533* (2013.01); *G06F 2009/45579* (2013.01)
(58) Field of Classification Search
None
See application file for complete search history.

(56) References Cited

U.S. PATENT DOCUMENTS

| 8,181,175 B1* | 5/2012 | McKee et al. ............... 718/1 |
| 8,762,531 B1* | 6/2014 | Yemini et al. .............. 709/226 |
| 2009/0193245 A1* | 7/2009 | Isaacson ..................... 713/2 |
| 2010/0082322 A1* | 4/2010 | Cherkasova et al. ......... 703/22 |
| 2011/0007746 A1* | 1/2011 | Mudigonda et al. ...... 370/395.21 |
| 2011/0126203 A1* | 5/2011 | Fahrig ..................... 718/102 |
| 2011/0302578 A1* | 12/2011 | Isci et al. ................... 718/1 |
| 2012/0185913 A1* | 7/2012 | Martinez et al. ............ 726/1 |
| 2012/0246638 A1* | 9/2012 | He et al. .................... 718/1 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Kenneth Tang
(74) *Attorney, Agent, or Firm* — Ryan, Mason & Lewis, LLP

(57) ABSTRACT

Techniques for measuring input/output (I/O) scheduling characteristics in a computing system implemented with distributed virtual infrastructure. In one example, a method comprises the following steps. A plurality of virtual machines is deployed in a computing system implemented in a distributed virtual infrastructure managed by at least one hypervisor component. At least one test workload is executed on the plurality of virtual machines in accordance with the at least one hypervisor component. Timing information is collected from the plurality of virtual machines during execution of the at least one test workload. Based on at least a portion of the collected timing information, one or more characteristics are identified of an input/output schedule employed by the at least one hypervisor component during execution of the at least one test workload on the plurality of virtual machines.

19 Claims, 6 Drawing Sheets

| 402 | Sequence_id | Unique id of IOC in time sequence |
|---|---|---|
| 404 | Daemon_id | The execution owner (IMD) of the IOC |
| 406 | Launch_time | The launch time of IOC controlled by the DC |
| 408 | End_time | The ending time of IOC collected by each IMD |
| 410 | File_info | Target file of IOC, e.g., /dev/sda1 |
| 412 | IO_mode | Operation mode: read or write, sync or non-sync |
| 414 | IO_offset | The offset in the file operated by IOC |
| 416 | IO_size | The I/O size of IOC, e.g., 4KB, 8KB and etc. |

FIG. 5

| | | |
|---|---|---|
| 502 | IMDM | Number of IMDs (VMs) in an experiment |
| 504 | TN | Total number of IOCs in an experiment |
| 506 | Switch | I/O request serving from one VM to another |
| 508 | Service period | I/O service for one VM between two switches |
| 510 | TSP | Total number of service periods |
| 512 | Cyclic Switch | Regular switch patterns of involving all IMDs |
| 514 | CSN | Total number of CS appeared in an experiment |
| 516 | CSF | CSF=CSN*IMDN/TN |
| 518 | OPN | Number of IOCs in a service period |
| 520 | AOPN | Average OPN in an experiment, AOP=TN/TSP |
| 522 | SDOP | Standard deviation of all OPNs in an experiment |
| 524 | RT(IO_SIZE) | response time of an IOC on IO_SIZE |
| 526 | ART(IO_SIZE) | Average response time of all IOCs on an IOSIZE |
| 528 | SDRT(IO_SIZE) | Standard deviation of all RT on an IO_SIZE |
| 530 | incART | incART = ART(2*IO_SIZE)/ART(IO_SIZE) |
| 532 | SNR | Signal-to-Noise Ratio, SNR=AOP/SDOP |

FIG. 6

| | | |
|---|---|---|
| 602 | Rule1 | IF $SNR > \alpha$, Deadline-like scheduler |
| 604 | Rule2 | IF $CSF < \beta$, As-like scheduler |
| 606 | Rule3 | IF $incART \in [2 - \epsilon, 2 + \epsilon]$, Noop-like scheduler |

FIG. 7

| | | |
|---|---|---|
| 700 | SLA | $\forall \ time_t$, measured IOPS, named as $\phi$, $\in$ [low, high] |
| | | $low$ and $high$ are min and max supported IOPS |
| | Rule1 | $Pr\ [(high - \phi) > \epsilon] < \tau$ |
| | | Tolerant range: $\epsilon$; Probability: $\tau$ |
| | Rule2 | $Pr\ [(low - \phi) > \theta] < \omega$ |
| | | Tolerant range: $\theta$; Probability: $\omega$ |

FIG. 8

| | | |
|---|---|---|
| 800 | SLA | In $\forall$ period $time_t$, $ART \in [0, a]$ and $SDRT \in [0, b]$ |
| | | $a$ and $b$ are defined by service providers |
| | Rules | $Pr[((ART - a) < \zeta) \land (|SDRT - b| < \eta)] > \kappa$ |
| | | Tolerant range: $\zeta$, $\eta$; Probability: $\kappa$ |

MEASUREMENT OF INPUT/OUTPUT SCHEDULING CHARACTERISTICS IN DISTRIBUTED VIRTUAL INFRASTRUCTURE

FIELD

The field relates to computing systems implemented with a distributed virtual infrastructure, and more particularly to techniques for measuring input/output (I/O) scheduling characteristics in such a computing system implemented with a distributed virtual infrastructure.

BACKGROUND

As is known, main elements of a virtual distributed infrastructure, also known as a cloud infrastructure, include components known as "virtual machines" and "hypervisors." Virtual machines are logical processing elements that may be instantiated on one or more physical processing elements (e.g., servers, computers, processing devices). That is, a virtual machine may be considered a software implementation of a physical machine (i.e., a computer) that is able to execute programs in a manner functionally similar to program execution on a physical machine. Thus, different virtual machines can run different operating systems and multiple applications on the same physical computer.

Virtualization is realized via the use of the hypervisor component, which is directly inserted on top of the computer hardware in order to allocate hardware resources of the physical computer dynamically and transparently. The hypervisor affords the ability for multiple operating systems to run concurrently on a single physical computer and share hardware resources with each other. The hypervisor thus also manages input/output (I/O) scheduling associated with the workloads performed by each virtual machine.

However, it is not uncommon for a distributed virtual infrastructure to be implemented on a physical computing platform that includes tens to hundreds of physical processing elements. Thus, I/O scheduling can be a challenging task. This can also pose a problem when the distributed virtual infrastructure is part of a computing system maintained and managed by an infrastructure provider entity as part of a chargeable service. In such a scenario, the provider entity typically has tenants (users of the infrastructure) who expect compliance with service level agreements (SLAs) that are agreed upon between the provider entity and the tenants in order to guarantee specific performance and security criteria. That is, the tenants as well as the infrastructure provider entity desire to confirm that there is compliance with the SLA.

SUMMARY

Embodiments of the invention provide techniques for measuring input/output (I/O) scheduling characteristics in a computing system implemented with distributed virtual infrastructure.

In one embodiment, a method comprises the following steps. A plurality of virtual machines is deployed in a computing system implemented in a distributed virtual infrastructure managed by at least one hypervisor component. At least one test workload is executed on the plurality of virtual machines in accordance with the at least one hypervisor component. Timing information is collected from the plurality of virtual machines during execution of the at least one test workload. Based on at least a portion of the collected timing information, one or more characteristics are identified of an input/output schedule employed by the at least one hypervisor component during execution of the at least one test workload on the plurality of virtual machines.

By way of one example, the timing information collection step may further comprise collecting an execution end-time value for each input/output command associated with the at least one test workload. The distributed virtual infrastructure may comprise an open-source distributed virtual infrastructure or a close-source distributed virtual infrastructure. The at least one test workload may operate in at least one of a sequential workload mode, a burst workload mode and a random workload mode in order to, for example, explore the time and space locality of the underlying I/O schedulers in the hypervisor.

In another embodiment, a computer program product is provided which comprises a processor-readable storage medium having encoded therein executable code of one or more software programs. The one or more software programs when executed by at least one physical processing element of the computer system implement steps of the above-described method.

In yet another embodiment, an apparatus comprises a memory and a processor operatively coupled to the memory and configured to perform steps of the above-described method.

Advantageously, embodiments described herein provide techniques for finding the relationship between I/O request patterns and I/O scheduling behaviors of a hypervisor associated with a distributed virtual (cloud) infrastructure. SLA compliance can therefore be confirmed and ensured based on the classification of the I/O scheduler of the hypervisor and/or learning I/O scheduling properties of the hypervisor.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Figure 1A:
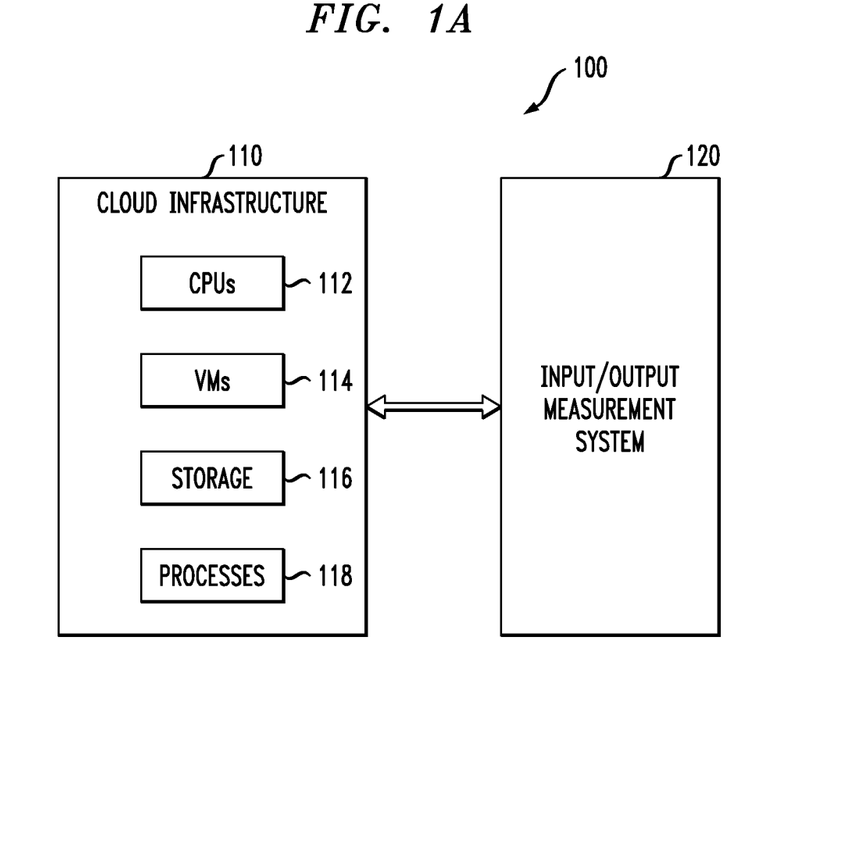
FIG. 1A illustrates cloud infrastructure and an input/output measurement system in accordance with one embodiment of the invention.

FIG. 1A shows a system 100 configured in accordance with an illustrative embodiment of the present invention. The system 100 comprises cloud infrastructure 110 and an input/output (I/O) measurement system 120. As will be explained in detail below, the I/O measurement system 120 determines properties and/or classifications (characteristics) of I/O schedulers associated with one or more hypervisors of implemented within cloud infrastructure 110, as will be explained in detail herein. Note that reference to the term "I/O" as used herein should be understood as hypervisor disk I/O. Cloud infrastructure 110 is illustratively depicted in the figure as comprising an execution environment with execution components comprising one or more central processing units (CPUs) 112, one or more virtual machines (VMs) 114, and storage devices 116 (upon which logical units (LUs) are implemented) that execute one or more processes 118 that operate on one or more process input data sets that generate one or more process output data sets.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the I/O measurement system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
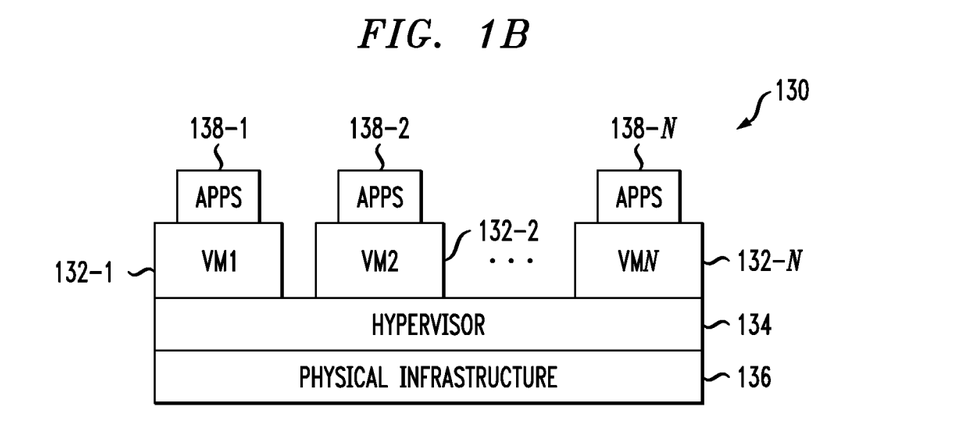
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134, as mentioned above, is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUs) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 134 which, as shown in FIG. 1B, is directly inserted on top of the computer hardware in order to allocate hardware resources of the physical computer (physical infrastructure 136) dynamically and transparently. The hypervisor 134 affords the ability for multiple operating systems to run concurrently on a single physical computer and share hardware resources with each other. The hypervisor 134 thus also manages disk I/O scheduling associated with the workloads performed by each virtual machine.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
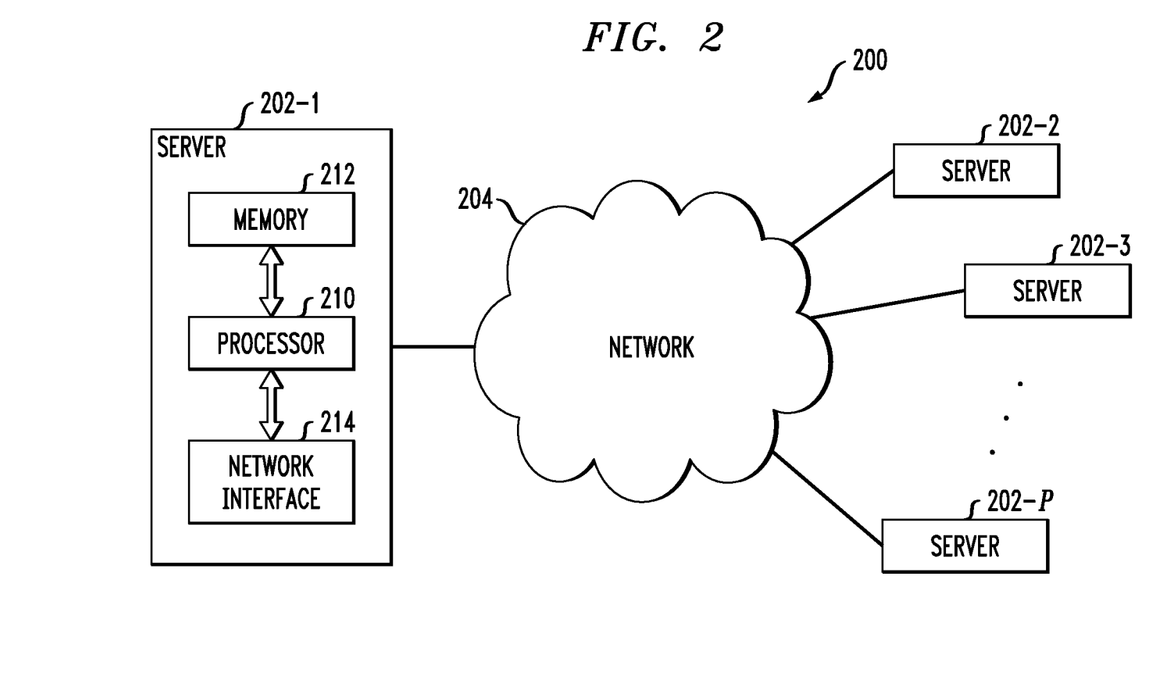
FIG. 2 illustrates a processing platform on which the cloud infrastructure and the input/output measurement system of FIG. 1A are implemented in accordance with one or more embodiments of the invention.

An example of a processing platform on which the cloud infrastructure 110 and/or the I/O measurement system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium (which is a non-transitory medium) having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, or various portions or combinations of these and other types of networks.

Illustrative details of the I/O measurement system 120, as well as operations of elements of system 120 will now be described with reference to FIGS. 3 through 8.

Embodiments of the invention provide methods and apparatus to identify characteristics of a hypervisor disk I/O scheduler. As trivial workloads generated by a single VM cannot fully reflect the I/O scheduling characteristics of the underlying hypervisor, embodiments provide a distributed VM I/O measurement framework which can control I/O workloads issued by co-resident VMs. Moreover, representative I/O workloads referred to as "probers" are provided under this framework for further efficient measurement. As will be further explained in detail, a prober is composed of several regular I/O patterns and is responsible for identifying the characteristics of hypervisor disk I/O scheduler including scheduling algorithms and other scheduling properties (e.g., I/O throughput, I/O response time, read/write priority, etc.).

As is well known, hypervisors can be divided into two classes, i.e., open-source (e.g., Xen® hypervisor developed by Citrix Systems Inc. of Fort Lauderdale, Fla.) and close-source (e.g., VMware® ESX server available from VMware® Inc. of Palo Alto, Calif.). As an open-source hypervisor adopts public scheduling algorithms, embodiments provide classification rules to distinguish different scheduling algorithms, i.e., gray-box analysis through pattern matching on I/O output can be applied to determine the I/O scheduling algorithm. While for close-source hypervisors with there own scheduling algorithms, black-box analysis is used to classify the scheduling algorithm and obtain the properties of the scheduler. In one embodiment, such I/O measurement and analysis operations are performed in accordance with the system shown in FIG. 3, which will now be described.

Figure 3:
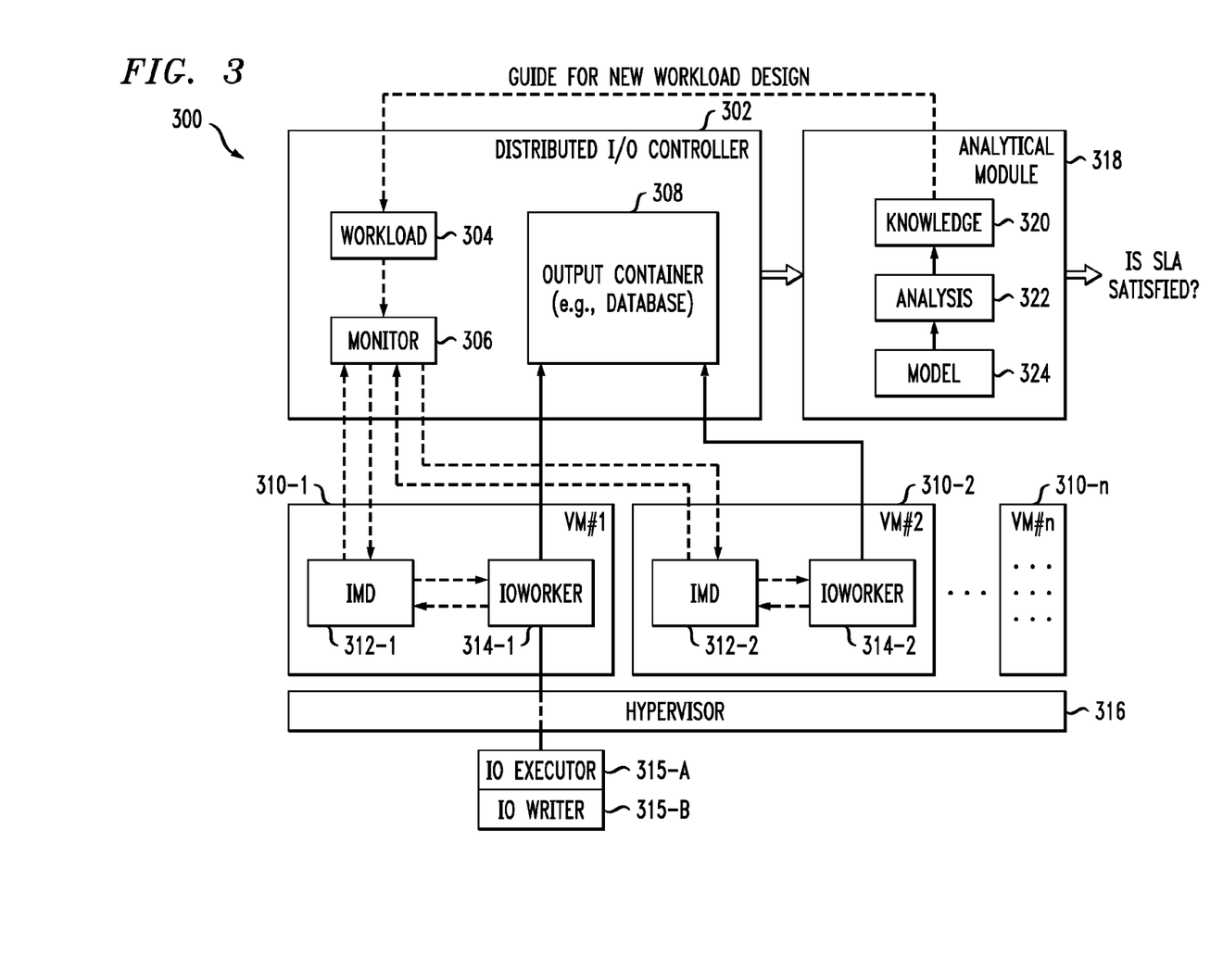
FIG. 3 illustrates an input/output measurement system environment in accordance with one embodiment of the invention.
Figure 4:
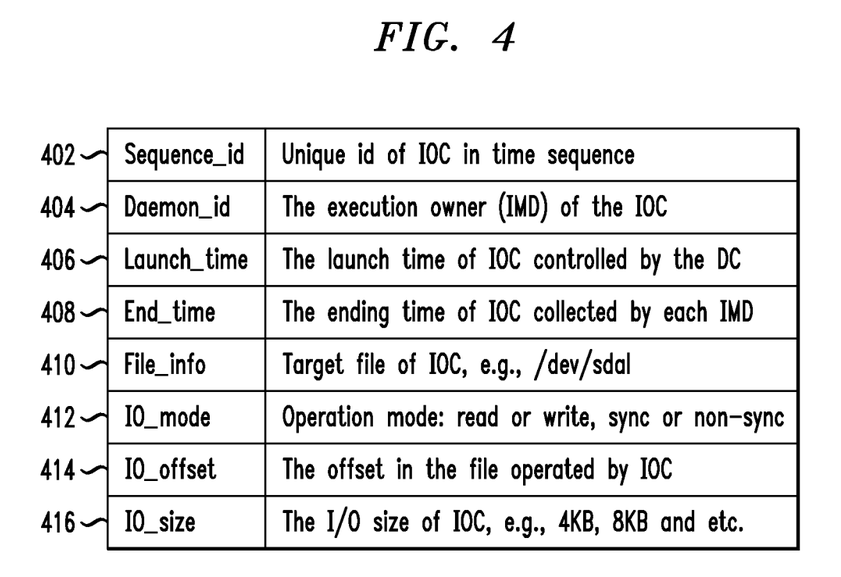
FIG. 4 illustrates input/output command descriptions in accordance with one embodiment of the invention.

FIG. 3 illustrates an I/O measurement system environment in accordance with one embodiment of the invention. As shown, the I/O measurement system 300, itself, includes a distributed I/O controller 302 with a workload module 304, a monitor module 306, and an output container (e.g., database) 308. The system 300 also includes an analytical module 318 with a knowledge component 320, an analysis component 322, and a model component 324. As further shown, the system 300 includes an I/O measurement daemon (IMD) component 312 and one or more IOWorker components 314 resident on each virtual machine (VM) 310. Each VM shown 310-1, 310-2, ..., 310-$n$ is managed by a hypervisor 316. It is to be appreciated that the VMs 310 and hypervisor 316 are not part of the measurement system 300 but rather are part of the virtual distributed infrastructure (cloud infrastructure) being probed and measured by the I/O measurement system 300.

In general, when the measurement process begins, the monitor module 306 of the controller 302 interacts with the IMDs (312-1, 312-2, ..., 312-$n$) embedded in the VMs (310-1, 310-2, ..., 310-$n$), and directs each IMD 312 to execute designated I/O tasks generated by the workload module 304 of the controller 302. Then, the outputs produced by each IMD 312 are stored in the output container 308 of the controller 302. The controller 302 then sends one or more requests to the analytical module 318 for knowledge extraction (from the knowledge component 320) and analysis (via analysis component 322 and model component 324). Based on the generated knowledge, the controller 302 can design more meaningful test workloads for next round experiments. After iterative workloads are executed on the VMs and analysis is performed, I/O scheduling characteristics can be extracted.

More specific details of the distributed I/O controller 302 will now be given.

The monitor module 306 is in charge of communicating with each IMD 312 and dispatching the workloads. Initially, the monitor module 306 waits for a registry request from each IMD 312. Upon receiving a registry request, a service process is spawned for information exchange through the virtual distributed infrastructure (which may be distributed across one or more communication networks). When the number of IMDs exceeds a certain threshold (by way of example only, three), the monitor module 306 starts to dispatch the I/O tasks to each IMD 312. For efficient operation, the following two issues are accounted for in monitor module 306:

(i) High concurrency. With the increasing number of IMDs 312, there is a larger burden on both network bandwidth and the computing system hosting the controller 302. To mitigate this issue, the monitor module 306 chooses to dispatch the I/O workload configuration to each IMD, then each IMD parses the configuration and executes the I/O workloads without further interaction with the monitor. Such approach has low communication overhead which is suitable for supporting more concurrent connection from IMDs.

(ii) Accurate time synchronization. In order to better evaluate the time locality of the I/O scheduler, reducing the lagging time of I/O commands is important. As each IMD 312 is located in a different VM 310, each of which may have different clock frequencies or physical time, the monitor module 306 synchronizes the time between the controller 302 and the IMDs 312. In one embodiment, the Network Time Protocol is used to provide a global time clock.

The workload module 304 generates representative I/O workloads, where the regular patterns of I/O workloads are defined through a group of single I/O commands (IOCs). In one embodiment, each IOC is described by tuple elements <sequence_id, daemon_id, launch_time, end_time, file_info, IO_mode, IO_offset, IO_size> shown in FIG. 4. Sequence_id 402 is the unique identifier of the IOC in a time sequence. Daemon_id 404 identifies the execution owner (IMD) of the IOC. Launch_time 406 is the start (launch) time of the IOC as controlled by controller 302. End_time 408 is the ending time of the IOC collected by the corresponding IMD 312. File_info 410 identifies the target file to be operated on by the IOC. IO_mode 412 identifies the operation mode, i.e., read or write, synchronous file I/O or asynchronous file I/O. IO_offset 414 identifies the offset in the file operated on by the IOC. IO_size 416 identifies the I/O size of the IOC.

As is known, I/O scheduling algorithms have two common control characteristics, i.e., space locality and time locality, that affect throughput and latency improvement. Throughput is typically considered the total number of processes that complete their execution per time unit. Latency is typically the total time between submission of a process and its completion (or the time between submission of a request and the time of receipt of a response to the request). With regard to space locality, scheduling algorithms (e.g., Deadline, CFQ—Completely Fair Queueing) continuously merge I/O requests in a logical block address (LBA), which reduces the interaction with disk hardware. With regard to time locality, scheduling algorithms (e.g., AS—anticipatory scheduler, CFQ) have a time window to anticipatorily execute the incoming I/O requests which are adjacent to previous I/O requests in the LBA. Thus, the design principle of I/O patterns is to exploit both space and time locality. As such, the following are defined workload modes according to embodiments of the invention:

(i) Sequential mode. Each designated IMD 312 reads or writes a target file (e.g., a raw disk device) from beginning to end. Furthermore, if each adjacent pair of IOCs (IOCi and IOCj), sorted by launch time, satisfies the formula: IOCj (IO_offset)=IOCi(IO_offset)+IOCi(IO_size), then such workload can be categorized as seq-non-gap mode workload. Generally, seq-non-gap mode is designed for verifying the space locality characteristics of the scheduler. Otherwise, if IOCj(IO_offset)>IOCi(IO_offset)+IOCi(IO_size), such workload can be described as a seq-gap mode workload. It is to be appreciated that "gap" defines the I/O distance between two adjacent operations on an LBA (logical block address). For example, if the first I/O operation is on LBA 0 and the I/O size is 4096, then the offset is relocated into LBA 4096 after the operation. If the second operation is also on LBA 4096, this is a seq-non-gap mode. From the file perspective, it means that the next I/O operation needs no I/O seek operation. For those I/O requests, the I/O scheduler can have a high probability to merge them.

(ii) Burst mode. Each receiver continually conducts designated I/O tasks in a given time interval. This mode can be applied to identify the maximum I/O throughput of the hypervisor 316.

(iii) Random mode. Among a fixed number of I/O commands, the IMD 312 randomly read/writes a target file in a ratio (ranging from 0% and 100%), and the remaining IOCs are sequential I/O commands. The usage of random mode is to measure VM I/O latency on different I/O sizes.

More specific details of an IMD 312 will now be given.

Each IMD 312, implemented as a daemon running within a VM 310, is responsible for interacting with the monitor module 306 and executes dispatched I/O commands. Once an IMD is adopted as a working node by the monitor module 306, it spawns several IOWorkers 314 according to the requirements from the monitor module 306. The IOWorkers can be considered as functionally part of the IMD. In FIG. 3, for simplicity, each VM (310-1, 310-2, . . . , 310-n) is shown as having only one IOWorker (314-1, 314-2, . . . , 314-n) running therein. However, as mentioned above, each IMD may spawn more than one IOWorker 314.

Each IOWorker 314 has two threads, i.e., IOExecutor 315-A and IOWriter 315-B. The two threads work in a producer-consumer mode. IOExecutor 315-A executes the IOCs and collects the end time of each IOC, then encapsulates each IOC and relocates them into a shared buffer. Then, IOWriter 315-B retrieves results from the shared buffer and writes them into the output container 308 of controller 302. Producer-consumer mode is practical in this scenario, since work done by IOWriter 315-B has nearly no influence on IOExecutor 315-A, thus IOExecutor 315-A can precisely execute the IOCs. For executing IOCs at a specified launch time, two approaches are provided:

(i) Time synchronization. Each VM 310 holding an IMD 312 synchronizes the time with the controller 302 through NTP during a working node registration process.

(ii) Timer event control. Timer policy is chosen, for example, in Linux kernel 2.6, to implement IOExecutor due to its flexibility, since it is not influenced by the process scheduler.

More specific details of analytical module 318 will now be given.

Analytical module 318 applies timing analysis on test (experimental) results via statistical methods in order to determine the representative I/O workloads, extract the scheduler knowledge, and determine corresponding classification rules. More particularly, model component 324 contains several models or algorithms defined to handle test workload results, while the analysis component 322 selects a model/algorithm to handle the test workload. Knowledge component 320 identifies the characteristics of the I/O scheduler. The flow from component 324 to 322 to 320 can include several iterative rounds.

Generally, I/O performance evaluation can be divided into the following two stages. Stage I finds "prober" (test) workloads, as will be further explained below. In one embodiment, each workload selected into the prober class distinguishes at least two types of I/O schedulers. Stage II extracts the scheduling characteristics of target hypervisor through prober workloads.

We now further describe techniques for identifying the hypervisor disk I/O scheduler and/or properties (more generally, one or more characteristics of I/O scheduling) using the I/O measurement system 300 described herein.

It is realized that with open-source hypervisors, the major task is to classify the I/O scheduling algorithm. With close-source hypervisors, the main task is to profile the scheduling properties.

Generally speaking, an I/O scheduler adopts an elevator based scheduling framework with two general queues, i.e., the "dispatch," by which the device driver conducts the I/O requests to the disk and the "elevator," which is responsible for merging, sorting the incoming requests, and feeding them back to the dispatch queue. In Linux, typically four scheduling algorithms can be configured to manage the elevator, i.e., Noop, Deadline, AS, and CFQ.

The elevator maintained by Noop is merely a single FIFO (first-in, first-out) queue. As a result, Noop just serves the concurrent requests from different processes in FIFO manner. In contrast, Deadline, AS and CFQ are composed of several sub data structures that support I/O request merging and sorting, thus these algorithms can serve more I/O requests from one process in a scheduling period, and the frequency of I/O service switching events is relatively low. In addition, Deadline guarantees that each I/O request can be timely completed without starvation, and maintains both read and write FIFO queues for throughput improvement. AS has a time window to anticipatorily execute the incoming I/O requests from the same process. CFQ is a complete fairness algorithm which has several priority queues to ensure the disk I/O bandwidth among process groups.

Compared with a non-virtualized environment, I/O operations within a VM are influenced by I/O schedulers in two tiers, i.e., VM kernel and hypervisor. To precisely extract knowledge of I/O scheduler in the hypervisor, the influence from the VM kernel should be reduced to a minimum. Thus two approaches are adopted: (1) Basic FIFO-like I/O scheduling (i.e., Noop) is selected; (2) File buffer cache is bypassed through the direct I/O mode.

We first consider classifying an open-source hypervisor.

For an open-source hypervisor, embodiments provide a set of workloads with seq-non-gap mode (defined above), named Prober-1, which is comparatively suitable for classifying open scheduling algorithms.

Figure 5:
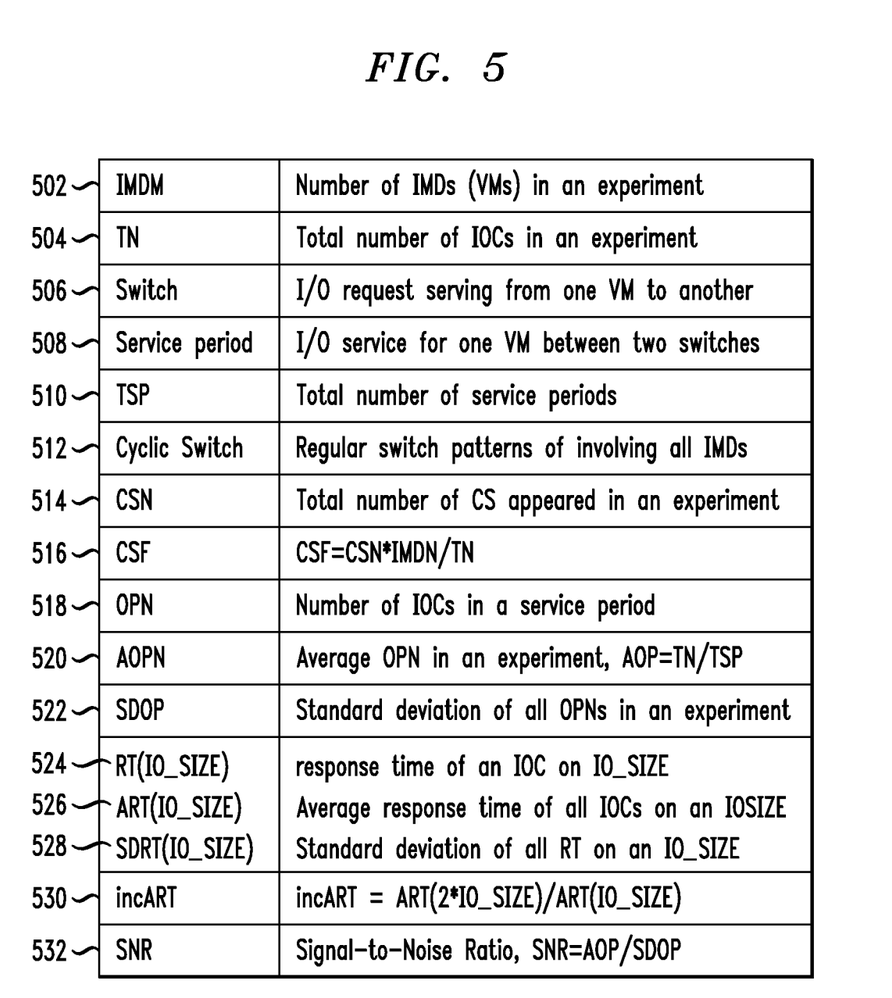
FIG. 5 illustrates analysis metrics for use in an input/output measurement system in accordance with one embodiment of the invention.

FIG. 5 lists the key features (502-532) for analyzing the effects after executing the Prober-1 on a virtualized platform. The concept of "switch" is introduced to measure the frequency when the hypervisor stops serving I/O requests issued by one VM and starts to serve I/O requests from another VM. In the analytical phase (module 318 in FIG. 3), all executed IOCs are sorted by end-time in the ascending order. If the neighboring IOCs are issued by different VMs, it is considered as a switch 506. Thus, a service period 508 for a VM can be defined as the I/O service between two switches. The total number of service periods is TSP 510. The Cyclic Switch (CS) 512 describes some regular switch patterns which involves all IMDs. For example, if there are three IMDs named as 0,1,2 (thus IMDN 502 is three), and each issues three commands and the final output sequence of the IOCs expressed by owners are: 0,1,1,2,1,2,0,2,0 (thus, TN 504 is nine), then tuple (0,1,2) is a CS and tuple (1,2,0) is another CS. Thus, CSN 514, the total number of cyclic switches, is two. The CSF 516 is ⅔, which reflects the fairness of the hypervisor I/O scheduler in switching.

Additionally, OPN 518 represents the completed IOCs for a VM in a service period, and SNR 532 (defined by AOPN 520 and SDOP 522) describes the stability of the I/O scheduler, i.e., whether the scheduler can serve nearly the same number of requests for equal VMs in a service period. Further, RT(IO_SIZE) 524 describes the I/O response time of a single IOC on an IO SIZE, and ART(IO_SIZE) 526 represents the average I/O response time on an IO SIZE. SDRT(IO_SIZE) 528 represents the standard deviation of all response times on an IO_SIZE. Lastly, incART 530 defines how variation of I/O size impacts ART.

Figure 6:
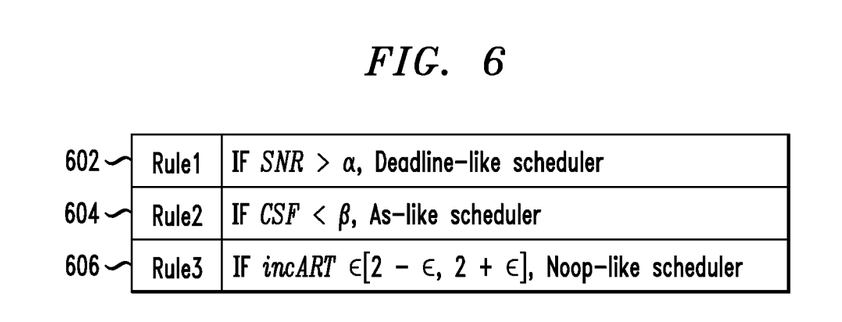
FIG. 6 illustrates rules for classifying input/output scheduling algorithms in accordance with one embodiment of the invention.
Figure 7:
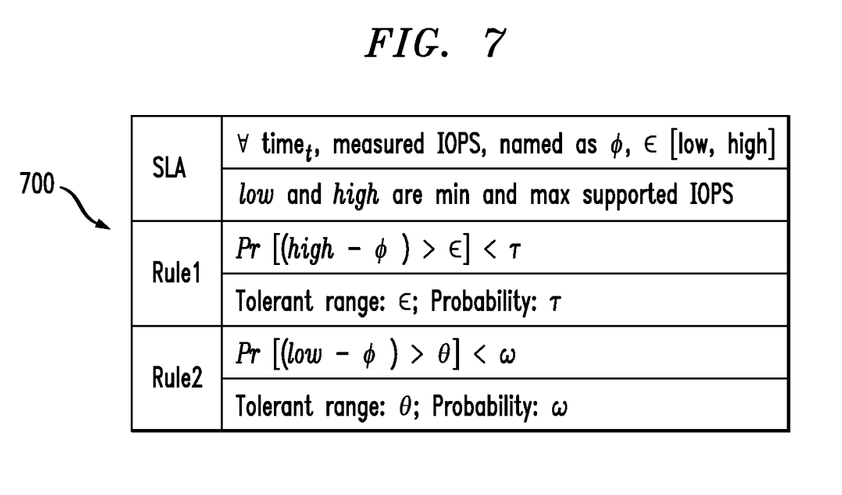
FIG. 7 illustrates standards for input/output throughput for measuring service level agreement compliance in accordance with one embodiment of the invention.

Extraction of the above features yields the ability to classify the open-source I/O scheduling algorithms which, in one embodiment, can be summarized as three decision rules listed in FIG. 6. As Rule 1 (602) suggests, if SNR values are consistently larger than a certain threshold $\alpha$, then we can predict that the hypervisor deploys a Deadline-like scheduler. Rule 2 (604) examines the CSF value to verify whether the scheduling method provides VMs with equal service, then an AS-like scheduler can be predicted if CSF is no larger than $\beta$. Rule 3 (606) can check whether a Noop-like scheduler is selected. If none of the three rules are satisfied, then CFQ can be suggested as the possible scheduling algorithm if there are only four possible schedulers. In one embodiment, we set $\alpha$ to 5.0, $\beta$ to 80.0% and $\epsilon$ to 0.20 empirically.

We now consider profiling the I/O properties of a close-source hypervisor.

For characteristics of a close-source virtualized platform, the previous mentioned classifier approach (for an open-source hypervisor) may not be sufficient enough to describe the characteristics of the I/O scheduler. Thus, embodiments of the invention provide methodologies to extract I/O scheduling properties including, but not limited to, VM I/O throughput, VM I/O execution latency, and VM read/write priority.

VM I/O throughput characteristics can be profiled through the following three features: (1) maximum I/O throughput; (2) throughput variation of a single VM with co-resident VMs; and (3) throughput isolation among VMs. For effective probing, we utilize a workload, named Prober-2, which combines both the seq-non-gap and burst modes (described above) to continually read or write the target files in a fixed interval (e.g., 10 seconds), with each IOC size ranging from 4 KB to 1024 KB.

With such a workload, the following characteristics of hypervisor I/O scheduler can be extracted:

(i) The performance capability of the system, i.e., maximal IOPS (input/output operations per second) and I/O bandwidth of both read and write operations.

(ii) The throughput isolation among VMs on both read and write operations. For example, we may find a VM write performance isolation is guaranteed, but the read is not.

(iii) Throughput variation of a single VM.

To profile the characteristics of I/O execution latency (I/O response time), a workload Prober-3 is provided, which utilizes the random mode (described above) to conduct read or write operations with random file offsets. Generally, the I/O response time (RT) of each IOC is calculated by the formula, i.e., RT(IOC)=End_time(IOC)−Launch_time(IOC). From the hypervisor's scheduler view, RT time of each IOC is composed of the wait time in the scheduler and the real serving time, i.e., RT(IOC)=wait_time(IOC)+serve_time (IOC). Assuming that all IOCs are continually executed, the serve_time of IOC_i can be expressed by serve_time (IOC_i)=End_time(IOC_i)−End_time(IOC_j), IOC_j is the latest completed IOC before IOC_i.

With such a workload, the following characteristics can be profiled:

(i) The RT variation on a single read/write IOC of a target VM in either single and multi-tenant environments.

(ii) The RT influence from sequential proportions on read/write operations.

(iii) The variation of serve_time which indicates the service model for read and write operations. For example, if the serve_time is nearly stable for the same IOC of a target VM in either single or multi-tenant environments, it indicates that the hypervisor ensures the serve_time of each read operation. In most cases, applications in the VM expect to immediately consume the results of read operations, so ensuring the serve_time with low VM I/O service switch is reasonable.

To profile the characteristics of VM read/write priority, we can still use Prober-2. In the experiments, VMs in the same hosts are required to apply Prober-2 to either execute read or write operations. VMs with read operations can be named as readers, VMs with write operations can be named as writers. Thus, experiments are performed whereby there are:

(i) N readers, M writers (N=M);
(ii) N readers, M writers (N>M); and
(iii) N readers, M writers (N<M)

With such workloads, embodiments of the invention profile the priority relationships of read and write operations on virtualized platforms. For example, if we find the write priority is higher than read, this may indicate that the performance isolation between a purely read VM and write VM cannot be guaranteed.

Thus, to summarize, for identifying the I/O scheduling characteristics of the hypervisor, several VMs are deployed in a target virtualized platform. Those VMs are controlled under the distributed VM I/O measurement framework (FIG. 3) to conduct designated I/O workloads.

If the target platform is an open-source platform, Prober-1 workloads are deployed under the framework and the results are collected. After the analysis, the system can use the I/O scheduling classifier to determine the I/O scheduler.

If the target platform is a close-source platform, Prober-2 and Prober-3 workloads can be deployed to conduct the profiling, thus the characteristics (e.g., throughput, I/O latency, read/write priority) can be profiled.

We now describe measuring VM I/O disk performance in order to determine SLA compliance. In accordance with one or more embodiments of the invention, a series of standards and corresponding "measurer" workloads are provided to measure the VM I/O performance in terms of throughput and latency based on the characteristics of the hypervisor disk I/O scheduler probed in a manner described above. A VM's I/O throughput SLA (THR(VM)) can be defined such that a VM's IOPS is sustainably guaranteed in a service period, as shown in table 700 of FIG. 7.

To measure THR(VM), we define a new workload, named Measurer-1 workload, which utilizes burst mode (defined above). In each experiment, the total IOPS of a VM is added up from completed IOPS generated by all participating processes or threads in the same period. More specifically, the IOPS variation of a single VM can be measured in the following way. The value of high can be measured in a single VM environment. Rule 1 in FIG. 7 can be applied to check the high boundary through results in n experiments. In contrast, the value of low can be measured in a multi-tenant VM environment. In the beginning of each experiment, the target VM executes the same workloads, then we continue adding co-resident VMs with heavy workloads as noise. Thus, Rule 2 in FIG. 7 can be implemented to verify whether the low boundary is achieved or not. For a VM I/O throughput isolation SLA, i.e., $\forall$VWi, THR(VMi) should be satisfied.

To verify the defined standard, in one embodiment, we deployed an OLTP (Online Transaction Processing) benchmark as Measure-1 in several VMs on a close-source hypervisor system. In our experiment, the average I/O size of OLTP is 8 KB and the throughput requirement is 1-2 MB/s, which means the hypervisor has to support IOPS$\epsilon$[128, 256] ($\theta$ and $\epsilon$ can be configured as 10, $\tau$ and $\omega$ can be configured as 5%). I/O measurement results indicate that the low boundary (value=128) could not be satisfied if there were more than one co-resident equal VMs. However, it is to be understood that we may not always choose OLTP as Measure-1 workload, as selection of Measure-1 is according to the requirements from tenants.

Figure 8:
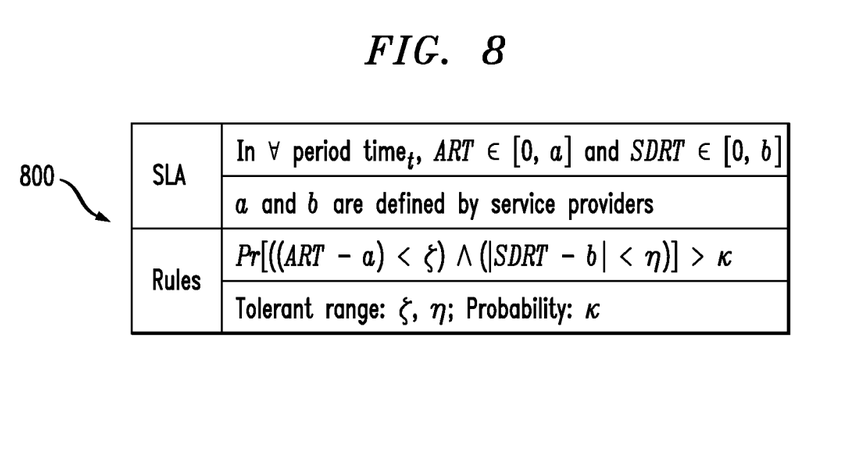
FIG. 8 illustrates standards for input/output latency for measuring service level agreement compliance in accordance with one embodiment of the invention.

A VM's I/O latency (LAT(VM)) SLA can be defined such that RT (response time) of I/O operations are continually ensured in a service period, as shown in table 800 of FIG. 8. To measure LAT(VM), we define a workload named Measurer-2, which utilizes various processes and threads in the random mode (defined above) to simultaneously read or write on target files. The experiments are still conducted in both single and multi-tenant VM environments. In n equal experiments on the same IO SIZE, rules defined in FIG. 8 are used to verify LAT(VM).

We still applied the above-mentioned OLTP benchmark as Measurer-2 in several VMs on the same close-source hypervisor system. In our experiment, the OLTP had the following configuration, i.e., 8K IO size, 67% read and 100% random access. And the requirement of ART ranged from 0 to 10 ms, meaning that the hypervisor has to support ART$\epsilon$[0, 10] ms (SDRT can be no larger than 5, $\zeta$ can be 1, $\kappa$ can be 90%). The RT measurement results indicate that the boundary of a (value=10) could not be satisfied if there were more than two co-resident equal VMs.

It is to be appreciated that the above-described measurer workloads are deployed via controller 302 as described above in the context of system 300 in FIG. 3 and, based on the text/experiment results, the analytical module 318 determines whether or not the subject SLA is satisfied.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   deploying a plurality of virtual machines in a computing system implemented in a distributed virtual infrastructure managed by at least one hypervisor component;
   executing at least one test workload on the plurality of virtual machines in accordance with the at least one hypervisor component, wherein said executing comprises executing a plurality of input/output commands;
   collecting timing information from the plurality of virtual machines during execution of the at least one test workload, wherein the timing information collection step further comprises collecting an execution end-time value for each executed input/output command associated with the at least one test workload; and
   based on at least a portion of the collected timing information, identifying one or more characteristics of an input/output schedule employed by the at least one hypervisor component during execution of the at least one test workload on the plurality of virtual machines;
   wherein the at least one test workload is selected such that execution of the selected test workload facilitates identification of the one or more characteristics, and is selected based on a manner in which the at least one hypervisor component performs input/output scheduling;
   wherein the one or more characteristics comprise at least one of a scheduling algorithm adopted by the at least one hypervisor component and scheduling properties of the at least one hypervisor component; and
   wherein one or more of the above steps are performed on at least one physical processing element associated with the computing system.

2. The method of claim 1, further comprising deploying an input/output measurement agent on each of the plurality of virtual machines.

3. The method of claim 2, wherein each input/output measurement agent controls collection of the timing information for the corresponding virtual machine during execution of the at least one test workload.

4. The method of claim 3, wherein each input/output measurement agent controls provision of the collected timing data for the corresponding virtual machine for access by a controller.

5. The method of claim 1, wherein the distributed virtual infrastructure comprises an open-source distributed virtual infrastructure.

6. The method of claim 1, wherein the distributed virtual infrastructure comprises a close-source distributed virtual infrastructure.

7. The method of claim 1, wherein the at least one test workload operates in a sequential workload mode.

8. The method of claim 7, wherein the sequential workload mode comprises one of reading and writing a target file from beginning to end at each of the plurality of virtual machines.

9. The method of claim 1, wherein the at least one test workload operates in a burst workload mode.

10. The method of claim 9, wherein the burst workload mode comprises continually performing a set of input/output tasks in a given time interval at each of the plurality of virtual machines.

11. The method of claim 1, wherein the at least one test workload operates in a random workload mode.

12. The method of claim 1, further comprising the step of, based on the one or more identified characteristics, classifying the input/output schedule employed by the at least one hypervisor component during execution of the at least one test workload on the plurality of virtual machines.

13. The method of claim 1, further comprising the step of, based on the one or more identified characteristics, measuring whether a service level agreement corresponding to virtual machine input/output performance is satisfied.

14. The method of claim 1, wherein the distributed virtual infrastructure comprises a cloud computing environment.

15. A computer program product comprising a processor-readable storage medium having encoded therein executable code of one or more software programs, wherein the one or more software programs when executed by the at least one physical processing element of the computing system implement the steps of the method of claim 1.

16. A method comprising:
  deploying a plurality of virtual machines in a computing system implemented in a distributed virtual infrastructure managed by at least one hypervisor component;
  executing at least one test workload on the plurality of virtual machines in accordance with the at least one hypervisor component;
  collecting timing information from the plurality of virtual machines during execution of the at least one test workload; and
  based on at least a portion of the collected timing information, identifying one or more characteristics of an input/output schedule employed by the at least one hypervisor component during execution of the at least one test workload on the plurality of virtual machines;
  wherein the at least one test workload operates in a random workload mode, which comprises one of randomly reading and randomly writing a percentage of a target file at each of the plurality of virtual machines;
  wherein one or more of the above steps are performed on at least one physical processing element associated with the computing system.

17. An apparatus comprising:
  at least one memory; and
  at least one processor operatively coupled to the at least one memory and configured to:
  deploy a plurality of virtual machines in a computing system implemented in a distributed virtual infrastructure managed by at least one hypervisor component;
  cause execution of at least one test workload on the plurality of virtual machines in accordance with the at least one hypervisor component, wherein said execution comprises executing a plurality of input/output commands;
  collect timing information from the plurality of virtual machines during execution of the at least one test workload, comprising collecting an execution end-time value for each executed input/output command associated with the at least one test workload;
  based on at least a portion of the collected timing information, identify one or more characteristics of an input/output schedule employed by the at least one hypervisor component during execution of the at least one test workload on the plurality of virtual machines;
  wherein the at least one test workload is selected such that execution of the selected test workload facilitates identification of the one or more characteristics, and is selected based on a manner in which the at least one hypervisor component performs input/output scheduling; and
  wherein the one or more characteristics comprise at least one of a scheduling algorithm adopted by the at least one hypervisor component and scheduling properties of the at least one hypervisor component.

18. The apparatus of claim 17, wherein the at least one processor is further configured to deploy an input/output measurement agent on each of the plurality of virtual machines.

19. A system comprising:
  a controller configured to:
    deploy a plurality of virtual machines in a computing system implemented in a distributed virtual infrastructure managed by at least one hypervisor component;
    cause execution of at least one test workload on the plurality of virtual machines in accordance with the at least one hypervisor component, wherein said execution comprises executing a plurality of input/output commands; and
    receive timing information collected from the plurality of virtual machines during execution of the at least one test workload, comprising an execution end-time value for each executed input/output command associated with the at least one test workload; and
  an analysis module operatively coupled to the controller and configured to, based on at least a portion of the collected timing information, identify one or more characteristics of an input/output schedule employed by the at least one hypervisor component during execution of the at least one test workload on the plurality of virtual machines;
  wherein the at least one test workload is selected such that execution of the selected test workload facilitates identification of the one or more characteristics, and is selected based on a manner in which the at least one hypervisor component performs input/output scheduling;

wherein the one or more characteristics comprise at least one of a scheduling algorithm adopted by the at least one hypervisor component and scheduling properties of the at least one hypervisor component; and wherein the controller and the analysis module are implemented on at least one physical processing element associated with the computer system.

* * * * *